US010485304B2

(12) United States Patent
Darland

(10) Patent No.: US 10,485,304 B2
(45) Date of Patent: Nov. 26, 2019

(54) FOOTWEAR COMPONENT TOOLING FOR USE WITH MICROWAVE ENERGY

(71) Applicant: NIKE, Inc., Beaverton, OR (US)

(72) Inventor: Jeffrey E. Darland, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 520 days.

(21) Appl. No.: 15/189,489

(22) Filed: Jun. 22, 2016

(65) Prior Publication Data

US 2016/0374435 A1    Dec. 29, 2016

Related U.S. Application Data

(60) Provisional application No. 62/185,286, filed on Jun. 26, 2015.

(51) Int. Cl.
*A43D 25/20* (2006.01)
*B29D 35/00* (2010.01)
(Continued)

(52) U.S. Cl.
CPC .............. *A43D 25/20* (2013.01); *A43B 13/04* (2013.01); *A43B 13/12* (2013.01); *A43B 13/32* (2013.01); *B29C 51/10* (2013.01); *B29C 65/245* (2013.01); *B29C 65/4835* (2013.01); *B29D 35/00* (2013.01); *B29D 35/142* (2013.01); *B32B 25/08* (2013.01); *B32B 27/306* (2013.01);
(Continued)

(58) Field of Classification Search
CPC ...... A43D 25/20; A43B 13/04; B29C 65/245; B29D 35/00; B32B 25/08; B32B 37/0046; B32B 37/06
See application file for complete search history.

(56) References Cited

U.S. PATENT DOCUMENTS 4,339,295 A * 7/1982 Boretos ............... B29C 65/1425
156/155
5,254,197 A    10/1993 Klems
(Continued)

FOREIGN PATENT DOCUMENTS

CN      101176577 A    5/2008
EP        1025976 A2    8/2000
(Continued)

OTHER PUBLICATIONS

Machine Translation of JP-60135230-A (Year: 1985).*
(Continued)

*Primary Examiner* — Daniel McNally
(74) *Attorney, Agent, or Firm* — Shook, Hardy & Bacon L.L.P.

(57) ABSTRACT

The utilization of heat in the manufacturing of footwear may be accomplished through microwave energy. The microwave energy is conveyed to the footwear components through a microwave transparent window of a tool. The microwave transparent tool window forms as least a portion of a part-contacting surface of the tool. Another surface of the tool is formed from a microwave reflecting material, such as aluminum. The footwear component(s) are exposed to microwave energy while within the tool such that the microwave energy passes through the tool window to cause a dielectric heating of one or more materials within a tool cavity of the tool.

15 Claims, 6 Drawing Sheets

(51) Int. Cl.
| | |
|---|---|
| *B29C 51/10* | (2006.01) |
| *A43B 13/04* | (2006.01) |
| *A43B 13/12* | (2006.01) |
| *A43B 13/32* | (2006.01) |
| *B29C 65/24* | (2006.01) |
| *B29C 65/48* | (2006.01) |
| *B29D 35/14* | (2010.01) |
| *B32B 25/08* | (2006.01) |
| *B32B 27/30* | (2006.01) |
| *B32B 37/00* | (2006.01) |
| *B32B 37/06* | (2006.01) |
| *B32B 37/12* | (2006.01) |
| *B32B 37/22* | (2006.01) |
| *B29K 621/00* | (2006.01) |
| *B29K 623/00* | (2006.01) |
| *B29L 31/50* | (2006.01) |
| *B29C 51/30* | (2006.01) |

(52) U.S. Cl.
CPC .......... *B32B 37/0046* (2013.01); *B32B 37/06* (2013.01); *B32B 37/1207* (2013.01); *B32B 37/223* (2013.01); *B29C 51/30* (2013.01); *B29C 2795/005* (2013.01); *B29K 2621/00* (2013.01); *B29K 2623/083* (2013.01); *B29L 2031/504* (2013.01); *B32B 2250/02* (2013.01); *B32B 2310/0862* (2013.01); *B32B 2319/00* (2013.01); *B32B 2331/04* (2013.01); *B32B 2437/00* (2013.01)

(56) References Cited

U.S. PATENT DOCUMENTS

| | | | |
|---|---|---|---|
| 6,497,786 B1 * | 12/2002 | Kilgore | A43B 9/12 |
| | | | 156/379.8 |
| 8,959,690 B2 | 2/2015 | Boardman et al. | |
| 9,049,901 B2 | 6/2015 | Dean et al. | |
| 2002/0038925 A1 | 4/2002 | Reimer | |
| 2004/0226648 A1 | 11/2004 | Gupte et al. | |
| 2014/0000043 A1 | 1/2014 | Boardman et al. | |
| 2014/0262010 A1 | 9/2014 | Heineck et al. | |

FOREIGN PATENT DOCUMENTS

| | | | | |
|---|---|---|---|---|
| FR | 2570580 A1 | 3/1986 | | |
| GB | 1067171 | 5/1967 | | |
| JP | 60135230 A | * 7/1985 | ............ | B29C 35/08 |
| JP | S60135230 A | 7/1985 | | |
| WO | 9208762 A1 | 5/1992 | | |
| WO | 9924498 A2 | 5/1999 | | |
| WO | 2014150839 A1 | 9/2014 | | |

OTHER PUBLICATIONS

International Search Report and Written Opinion dated Sep. 9, 2016 for International Patent Application No. PCT/US2016/039592, 11 pages.

International Preliminary Report on Patentability dated Jan. 4, 2018 in International Patent Application No. PCT/US2016/039592, 7 pages.

* cited by examiner

FOOTWEAR COMPONENT TOOLING FOR USE WITH MICROWAVE ENERGY

CROSS-REFERENCE TO RELATED APPLICATIONS

This application claims the benefit of U.S. Provisional Application No. 62/185,286, filed on Jun. 26, 2015, entitled "FOOTWEAR COMPONENT TOOLING FOR USE WITH MICROWAVE ENERGY," the entirety of which is incorporated by reference.

TECHNICAL FIELD

The aspects hereof relate to tooling to be used with microwave energy for components of an article of footwear.

BACKGROUND

An exemplary article of footwear, such as a shoe, is described for background purposes. A typical shoe comprises an upper and a sole structure. The sole structure, in turn, may comprise a midsole and an outsole. While a separate midsole and outsole are discussed, it is contemplated that the sole structure may be formed such that the midsole and the outsole are merely regions of a commonly formed structure. For reference purposes, an exemplary shoe may be divided into three general regions or areas: a forefoot or toe region, a midfoot region, and a heel region. The shoe also comprises a lateral side and a medial side. The lateral side generally extends along a lateral side of a user's foot when in an as-worn configuration. The medial side extends along a medial side of the user's foot when in an as-worn configuration. The lateral side and the medial side are not intended to demarcate specific areas of the shoe. Instead, they are intended to represent general areas of the shoe that are used for reference purposes for the following discussion. For example, the medial side and the lateral side may converge near the toe region at respective sides of a toe box. Similarly, it is contemplated that the medial side and the lateral side may also converge at respective sides of the heel region. Therefore, depending on the shoe design and construction, the terms medial, lateral, toe, heel, and the like generally refer to a proximate location and may not be limiting.

The upper portion of an article of footwear is generally secured to the sole structure and defines a cavity for receiving a foot. As mentioned above, the sole structure may comprise the outsole and the midsole. The outsole forms a ground-engaging surface of the sole structure. The midsole is generally positioned between the upper and the outsole. The outsole and/or the midsole may be formed of conventional materials, such as rubber, leather, or a polymer foam material (polyurethane or ethylene-vinyl acetate, for example). The outsole may be integrally formed with the midsole, or the outsole may be attached to a lower surface of the midsole.

Components of a shoe, such as a midsole and an outsole, may be joined together with an adhesive. In traditional examples, the adhesive may be activated by a conventional oven that heats the combination of materials (e.g., components and adhesive) to a sufficient temperature to activate the adhesive. However, raising the temperature of the components to get the adhesive to a sufficient temperature may affect the components (e.g., deform, burn, and the like) in an undesirable manner. Similar, components of footwear may be formed or molded in a tool that is exposed to traditional heat sources. The use of a traditional heat source (e.g., conduction, radiation) may be inefficient as it also heats the tooling and is indiscriminate as to the materials being heated.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects generally relate to a footwear manufacturing tool for use with microwave energy. The tool is comprised of a first tool portion forming a portion of a tool cavity into which the footwear component will be placed. The tool is also comprised of a window component formed from a microwave transparent material. The window component also forms at least one surface of the tool cavity. Additionally, the window component is secured within a perimeter component. The perimeter component may be formed from a microwave reflective material, such as the material forming the first tool portion. Therefore, microwave energy may enter the tool cavity through the window component as the microwave energy is focused at different location of the window component.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
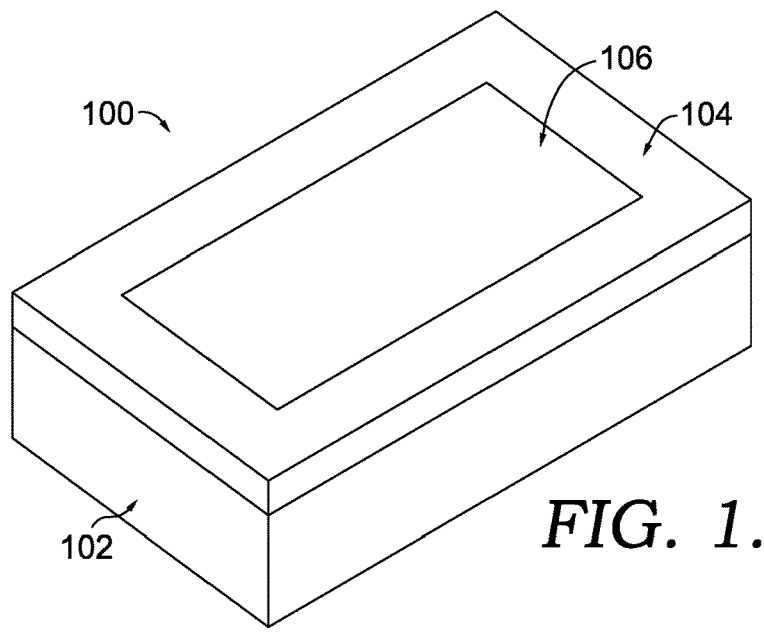
FIG. 1 depicts a perspective view of a tool comprised of a first tool portion and a second tool portion, in accordance with aspects hereof.

Heat is used in the manufacturing of footwear to form components, activate materials, and/or otherwise aid in the manufacturing of the article of footwear. For example, heat may be used to activate an adhesive used to bond two or more components together. Additionally, heat may be used to cure/activate/form/mold a foamed material, such as an ethylene-vinyl acetate ("EVA") portion of a sole. However, some components in an article of footwear may not respond in a desired way to some temperatures and/or durations of exposure to thermal energy. Therefore, use of conventional ovens that rely on conduction and/or radiation to generate thermal energy at a component may adversely affect one or more associated components to the article of footwear. This unintentional effect may limit potential applications of thermal energy during the manufacturing of an article of footwear and instead cause the manufacturing process to rely on less effective, more costly, and/or slower processes, in some examples.

Specifically, it is contemplated that an EVA midsole component that is intended to be bonded with a rubber outsole component with a heat-activated adhesive layer may experience adverse effects from an application of thermal energy from a traditional oven or heat source when activating the heat-activated adhesive there-between. A temperature at which the adhesive activates (e.g., melts, softens, plasticizes, adheres, and the like) may be at a temperature that causes the EVA to deform or otherwise alter the characteristics of the EVA components such that it is inadequate for use in the article of footwear. For example, the sizing and/or density of the foam EVA may alter, even slightly, with the exposure to the adhesive-activating heat that is intended to bond the midsole with the outsole, in this example.

In an additional example of where the application of heat by a traditional heat source relies on conduction and/or radiation to achieve a desired thermal energy at a component, the molding of a foamed component using traditional heat generating means can be improved. For example, the tooling (e.g., mold) used to mold a foamed component (e.g., EVA-based component) may need to be heated in addition to the actual foamed component in order to transfer (e.g., conduct) the thermal energy to the foamed component from an external-to-the-mold-cavity energy source. Therefore, energy is applied to the mold itself as opposed to directly to the intended target material, the article of footwear component within the mold cavity. This indirect application of heat may slow down the process, introduce inefficient energy transfer, and introduce additional delays if the tooling needs to be cooled prior to a subsequent use, for example. Additional manufacturing scenarios are contemplated where a tradition conduction and/or radiation source of heat may be replaced with a directed microwave beam application using a multipart tool having both transparent and reflective microwave materials forming the tooling.

As such, it is contemplated herein that microwave energy having a directed beam is useable to generate thermal energy in one or more components of an article of footwear. For example, it is contemplated that a tooling in which the component(s) are placed for receiving the microwave energy is formed from at least two different materials. The first material may be metallic, such as aluminum, which is effective to reflect microwave energy. The second material forming the tooling is a more microwave transparent material, such as a polytetrafluoroethylene (e.g., TEFLON), quartz, liquid silicone rubber, glass epoxy laminates (e.g., G10), and the like. The first material contacts the component(s) in the tool cavity and the second material contacts the component(s) in the tool cavity, in an exemplary aspect. A focused beam, such as a Gaussian beam, of microwave energy is applied to the tool at the second material such that the focused beam of microwave energy is able to enter the tool cavity having the component(s) through the second material. It is contemplated that one or more reflectors alter the position of the microwave beam prior to the microwave beam interacting with the second material. This positioning of the focused microwave beam allows for a controlled application of microwave energy to the component(s) without relying on internal reflection of the energy within the tool cavity. Further, it is contemplated that the second material forming a window component of the tool may substantially extend across a surface of the component(s) facing the window component. This significant exposure of the component(s) to the second material is in contrast to a port or other aperture at a location of the tool that allows microwave energy to enter a metallic tool cavity but then relies on internal reflection within the tool cavity to distribute the microwave energy to surfaces of the component(s) distant from the small entry port/opening.

Microwave energy is a form of electromagnetic radiation. Microwaves may have a wavelength that range from one meter to one millimeter. Microwaves may be in frequencies between 300 MHz (1 meter wave length) to 300 GHz (1 millimeter wavelength). Microwave energy can interact with materials based on a number of factors (e.g., power, frequency, proximity, beam shape) to cause a generation of thermal energy known as dielectric heating. Depending on the material and the factors, different degrees of dielectric heating may be accomplished. For example, each material has a dielectric value that provides an indication as to a degree/type of response that will be recognized based on factors of the microwave energy. For example, a first material may substantially reflect microwave energy at a first set of factors, a second material may substantially be transparent to the microwave energy at the same first set of factors, and a third material may convert the microwave energy into thermal energy using dielectric heating. Stated differently, the first material may reflect microwave energy, the second material may allow the microwave energy to pass through, and the third material gets hot with the same microwave energy. This phenomenon is evident in a traditional kitchen microwave oven where the first material forms the surfaces of the microwave oven to bounce the microwave energy around the internal chamber, the second material may be a "microwave safe" dish that does not substantially react to the microwave energy as compared to the food contained therein, which is the third material that reacts and is heated.

Microwave energy may be formed from a variety of sources, such as a magnetron, a gyrotron, a klystron, and a traveling wave tube, in an exemplary aspect. The microwave energy may be in the form of an unformed beam that relies on random scattering reflection to spread across a given volume, such as a tool cavity. The beam may also be a directed beam where the beam is positioned, such as through positionable reflectors, at a particular location for the application of the beam. An example of a microwave energy mode contemplated herein is a directed Gaussian beam, such as a TE00 and/or a TEM00 Gaussian beam mode. In this example, the output of the microwave source, such as a gyrotron or a klystron, is a Gaussian beam that may or may not be reflected by one or more reflectors prior to the microwave energy entering into a mold cavity, as will be discussed hereinafter. It is contemplated that the microwave energy may be rastered, striped, or otherwise distributed in an area-covering pattern to distribute the energy in an organized manner.

A Gaussian beam is a beam of electromagnetic radiation whose transverse electric field and intensity (irradiance) distributions are approximated by Gaussian functions. The microwave source may emit a beam of microwave energy that approximates a Gaussian profile, in which case the microwave source may be said to be operating on the fundamental transverse mode, or "TEM00 mode." The mathematical function that describes the Gaussian beam is a solution to the paraxial form of the Helmholtz equation. The solution, in the form of a Gaussian function, represents the complex amplitude of the beam's electric field. The electric field and magnetic field together propagate as an electromagnetic wave. A transverse electromagnetic (TEM) mode has neither the electric nor the magnetic field in the direction of propagation. A transverse electric (TE) mode has no electric field in the direction of propagation. These are sometimes called H modes because there is only a magnetic field along the direction of propagation. Alternative Gaussian beam modes are contemplated and alternative beam structures from the Gaussian beam may be implemented in aspects hereof. However, a Gaussian beam provides a focused beam of microwave energy in an exemplary aspect hereof.

Additionally, it is contemplated that the microwave energy used herein may be within a particular frequency range, in an exemplary aspect. For example, the range of energy may be from 10 GHz to 90 GHz. In a further exemplary aspect, the microwave energy may have a frequency in the range of 23 GHz to 90 GHz, for example. It is contemplated that any microwave or even radio frequency (RF) may be implemented in exemplary aspects hereof.

As such, it is contemplated that microwave energy of a varied or relatively constant frequency is applied to a tool comprising a first material (e.g., aluminum) and a second material (e.g., polytetrafluoroethylene) to dielectrically heat one or more components of an article of footwear contained within the tool. In this example, the second material forms a window component of the tool. The window component is more transparent to the microwave energy than the first material. Conversely, the first material is more reflective to the microwave energy than the second material. Both the first material and the second material in an exemplary aspect form contacting surfaces of the tool cavity for which the article of footwear component(s) contact. It is further contemplated that one or more reflectors that are external to the tool direct the focused microwave energy beam through different locations of the contiguous window portion formed from the second material. By directing the focused microwave energy beam to multiple locations, the microwave energy is delivered in a controlled and planned manner to the article of footwear component(s) that allows for varied and planned amounts of microwave energy to be applied at specific locations, in an exemplary aspect.

Turning to FIG. 1 that depicts a perspective view of a tool 100 comprised of a first tool portion 102 and a second tool portion, in accordance with aspects hereof. The second tool portion, in this example, is comprised of a perimeter component 104 and a window component 106. However, as will be illustrated and discussed with respect to FIGS. 6 and 7 hereinafter, the first and/or second tool portions may be comprised of additional (or fewer) distinct components. For example, it is contemplated that the second tool portion may be comprised of a midplate that is positioned between the first tool portion and another part of the second tool portion (e.g., the window component 106). This multipart construction for one or more of the tool portions may facilitate complex geometric needs of the tooling and/or allow for less expensive machining/manufacturing of the tool portions, in an exemplary aspect.

The tool 100 is simplified for illustration purposes. For example, the window component 106 is depicted of a rectilinear shape; however, it is contemplated that the window component 106, in an exemplary aspect, has a profile shape resembling a facing surface of the article of footwear component to be maintained within the tool 100 cavity. Similarly, when FIGS. 2-5 are discussed hereinafter, the depiction of various surfaces, cavities, openings, and the like are simplified for discussion purposes. But, it is contemplated that any of these features may be of any size, shape, and/or configuration to accomplish aspects provided herein. Examples of more complex, but non-limiting, configurations will be depicted in FIGS. 6 and 7 hereinafter, for example.

The first tool portion and other portions of the tool are contemplated to be formed from a microwave energy reflective material, in exemplary aspects. For example, the first tool portion may be made from a metallic material. Aluminum, iron, steel, copper, brass, and other alloys and metals are contemplated as microwave reflective materials. For example, it is contemplated that the perimeter component 104 is formed from the same type of material as the first tool portion 102, in an exemplary aspect. The use of a microwave energy reflective material allows the tool to remain cool (or cooler) during use because the microwave energy minimally heats the reflective material as the energy is not absorbed by the reflective material. Additionally, in the example of aluminum as the reflective material, the aluminum provides a robust and efficient tooling material.

Conversely, the window component 106 is contemplated to be formed from a microwave energy transparent material. A microwave transparent material is relative to the microwave reflective material. Therefore, it is contemplated in exemplary aspects that the microwave energy transparent material may provide some absorption of microwave energy, but in general is less responsive to the microwave energy than the material to be included in the tool cavity. Further, the microwave energy transparent material is transparent relative to the first material forming the first tool portion 102, in an exemplary aspect. Microwave transparent materials include, but are not limited to, polytetrafluoroethylene (e.g., TEFLON), liquid silicone rubber, quartz, glass epoxy laminates (e.g., G10), and other materials having similar dielectric properties. A glass epoxy laminate may be composed of a woven glass fabric combined with a halogen-free epoxy resin, in an exemplary aspect, to form a material that serves as a microwave energy transparent material in the context provided herein.

Figure 2:
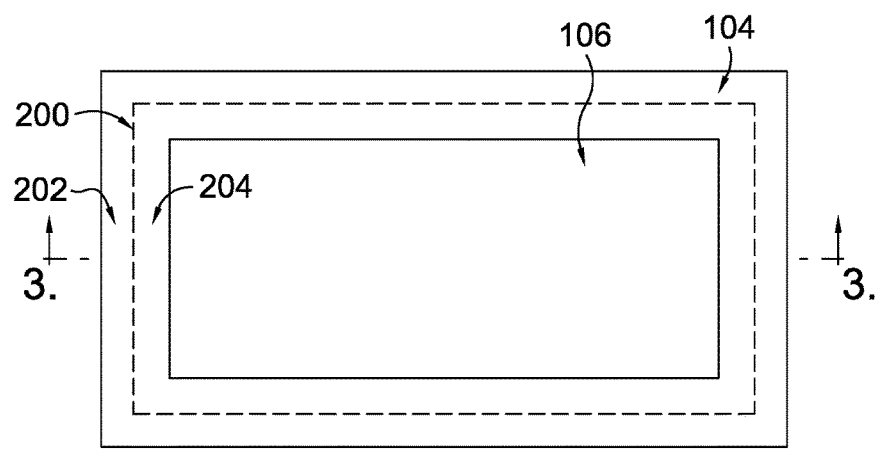
FIG. 2 depicts a top plan view of the tool of FIG. 1, in accordance with aspects hereof.
Figure 3:
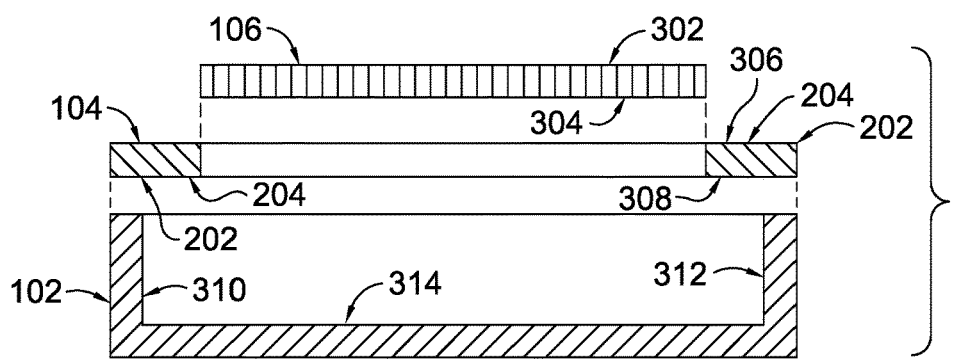
FIG. 3 depicts an exploded cross-sectional view of the tool along line 3-3 of FIG. 2, in accordance with aspects hereof.

Turning to FIG. 2, it depicts a top plan view of the tool 100 of FIG. 1, in accordance with aspects hereof. Specifically, a cavity edge is depicted by dashed line 200. The cavity edge, as depicted in FIG. 3, is where the tool cavity is defined. For example, an area 204 represents a portion of the perimeter component 104 that extends into the tool cavity. An area 202 represents a portion of the perimeter component 104 that extends over a portion of an underlying tool portion, such as the first tool portion in the example of tool 100.

It is contemplated that the area 204 obscures a portion of the tool cavity from a top-down application of microwave energy. For example, if the tool cavity is substantially filled with an article of footwear component, a portion of the footwear component is obscured from the top-down perspective of FIG. 2 by the area 204. It is contemplated that the area 204 extends less than 10 centimeters from the cavity edge (e.g., dashed line 200 in FIG. 2). In an exemplary aspect, the area 204 extends 10 millimeters or less from the cavity edge. The length of extension from the cavity edge, in an aspect, is constrained by a limitation in the conduction of thermal energy from the footwear component to the area of the footwear component obscured by the perimeter component 104. For example, if a directed microwave beam is applied to the tool 100 such that the microwave beam is only directed to the microwave transparent material, a portion of the footwear component obscured by the perimeter component 104 at area 204 will not be directly exposed to the microwave beam. Therefore, to achieve a desired heating of the footwear component at the obscured portions, the thermal energy will be conducted from surrounding material that is exposed to the microwave energy, in an exemplary aspect. The less conductive the material, the smaller the area 204 extends from the tool cavity edge, in an example. Therefore, materials (e.g., EVA, rubber, hot-melt adhesive) contemplated to be placed in the tool cavity allow, in an example, for the area 204 to extend from the tool cavity edge 10 cm or less to achieve a needed temperature of the material.

While the previous example focused on a distance to define an amount of a part that can be obscured by the area 204 (e.g., a non-microwave transparent material), it is further contemplated that the amount of obstruction (or conversely the amount of transparency) may be determined and described based on a percentage of part surface area exposed to the window component 106 or obscured by the area 204. For example, for an exemplary material (e.g., EVA), the area 204 may obscure 10% or less of the surface area of the part surface to be exposed to the microwave energy. Stated differently, the window component 106 covers 90% or more of an entire surface of a part within the tool 100. For yet an alternative way of stating the above concept absent the part, it is contemplated that the window component 106 covers at least 90% of an inner mold surface (e.g., inner surface 314 discussed hereinafter). Having 90% or greater coverage provides sufficient exposure of the directed microwave energy (e.g., a Gaussian beam) to generate a desired effect by the microwave energy on the component/part to be formed in the tooling, in an exemplary aspect. This is in contrast to a window providing less than 90% coverage that would require excessive energy application to achieve a desired result near the obscured portions of the part/component. Additionally, if the window is less than 90% coverage of part surface area, obscured portions of the part may not be affected (e.g., not cured) to a desired level when avoiding excessive application of microwave energy near the obscured portions. As such, a window providing 90% or greater coverage to the part provides benefits in manufacturing that may not be provided by a mere port opening that provides 20% or less microwave energy transparency, in an example. It is contemplated that the surface area coverage percentage by the microwave energy transparent window may be 80%, 85%, 90%, 92.5%, 95%, 97.5%, 99%, and/or 100% in aspects to achieve results within tolerance.

Turning to FIG. 3, it depicts an exploded cross-sectional view of tool 100 along line 3-3 of FIG. 2, in accordance with aspects hereof. As depicted, the window component 106 has a top surface 302 and an opposite bottom surface 304. The perimeter component 104 has a top surface 306 and an opposite bottom surface 308. The first tool portion 102 has tool cavity side surfaces 310 and 312 as well as a tool cavity inner surface 314.

As depicted, the perimeter component 104 is comprised of a window opening that extends through the top surface 306 and the bottom surface 308. The window component 106, in an exemplary aspect, extends through the window opening such that the window bottom surface 304 is at least flush, if not extending beyond, the perimeter component 104 bottom surface 308, in an exemplary aspect. As will be discussed hereinafter, the window bottom surface 304 forms an inner surface of the tool cavity, such as an opposite inner surface of the tool cavity to the inner surface 314, in an exemplary aspect. The side surfaces 310 and 312, the inner surface 314, the perimeter bottom surface 308 in the area 204, and the window bottom surface 304 form surfaces of the tool cavity, in exemplary aspects. The tool cavity surfaces are contacting surfaces for the to-be-inserted footwear component, in an exemplary aspect. Stated differently, it is contemplated that the footwear component contacts the window bottom surface 304, the inner surface 314, the side surfaces 310 and 312, and the perimeter bottom surface 308, in exemplary aspects. It is contemplated that the contacting surfaces, in an exemplary aspect, serve as a forming and/or molding surface to the footwear components. For example, dimensional elements (e.g., protrusions, depressions, shaping) may be formed into the footwear components by the tool and the contacting surfaces in particular.

As depicted in FIGS. 1-3, the window component 106 forms a majority of a tool cavity surface, such as a top surface, in an exemplary aspect. The surface comprised of the window component may be selected within the tool to provide the greatest surface area of the footwear component and/or a minimized thickness of material through which the microwave energy is to penetrate. For example, referring to a typical footwear sole, the top surface (e.g., footbed surface) of the sole or the bottom surface (e.g., ground-contacting surface) of the sole provide a greater surface area than may be achieved at a side wall (e.g., surface extending between the top and bottom surfaces). Therefore, the window component may be selected in the tooling to allow a transparent material to form a portion of the tool relative to the selected footwear component surface (e.g., top surface or bottom surface). A distance of the component from the microwave penetrating surface to the opposite surface may also be minimized by selection of the window component location relative to the minimized distance. In the example of a traditional sole, the distance between the top and bottom surface is less than a distance between a medial sidewall and a lateral sidewall. By maximizing surface area and minimizing a depth of material to be penetrated by microwave energy, lower power, faster microwave energy application, and different wavelengths of microwaves may be implemented. Further, fewer burns, hotspots, and other unintended results of applying microwave energy may be avoided, in exemplary aspects.

Figure 4:
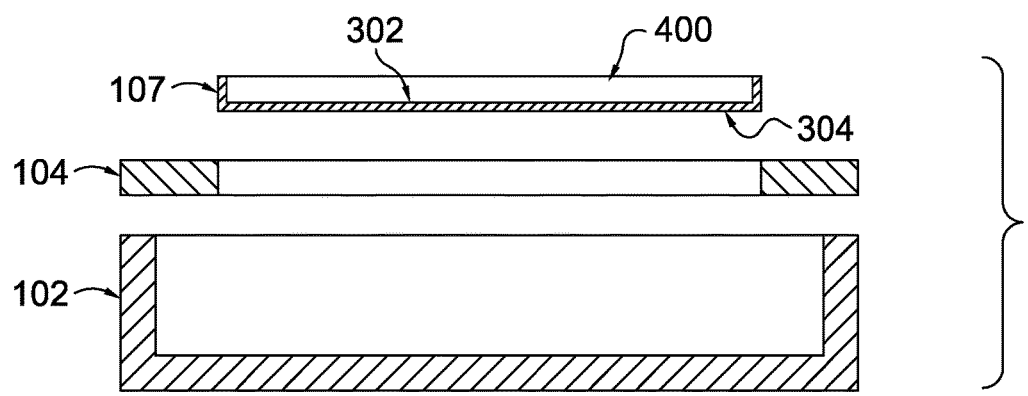
FIG. 4 depicts a cross-sectional view of another exemplary tool, in accordance with aspects hereof.

Turning to FIG. 4, it depicts a cross-sectional view of another exemplary tool, in accordance with aspects hereof. The tool of FIG. 4 is similar to that of FIG. 3, except a window component 107 has a recessed portion 400 that recesses the top surface 302. The recessed portion 400 may be formed to reduce a volume of material (e.g., microwave transparent material) used to form the window component 107. The reduction in volume created by the recessed portion 400, or other volume reduction portions, may reduce the weight of the overall tooling by limiting the volume of the window component material. The volume reduction of the window component 107 may also facilitate minimizing an amount of material through which microwave energy passes before penetrating the footwear component. Therefore, even if the microwave transparent material forming the window component 107 reacts, even slightly, with the microwave energy, the interference with the microwave energy may be reduced to achieve efficiencies in the microwave energy utilization, in an exemplary aspect.

Figure 5:
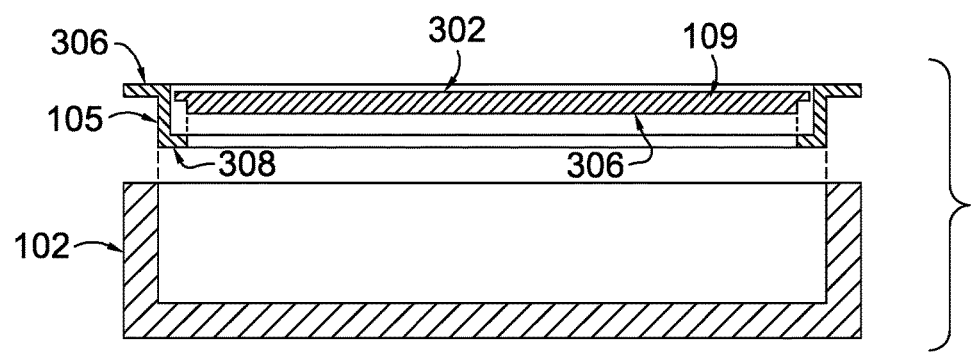
FIG. 5 depicts another cross-sectional view of another exemplary tool, in accordance with aspects hereof.

Turning to FIG. 5, it depicts a cut view of another exemplary tool, in accordance with aspects hereof. The tool of FIG. 5 is similar to that of FIG. 3, except a window component 109 has a flange to engage with a perimeter component 105. The perimeter component 105 is depicted with a recessed portion into which the window component 109 is positioned. FIG. 5 demonstrates that a variety of configurations of components may be implemented to achieve aspects hereof. For example, when the window component serves as a part-contacting surface for one or more footwear components within the tool cavity, the use of recessed portions, flanges, and the like allows for the tooling to adjust for varied component sizes, configurations, and the like.

Figure 6:
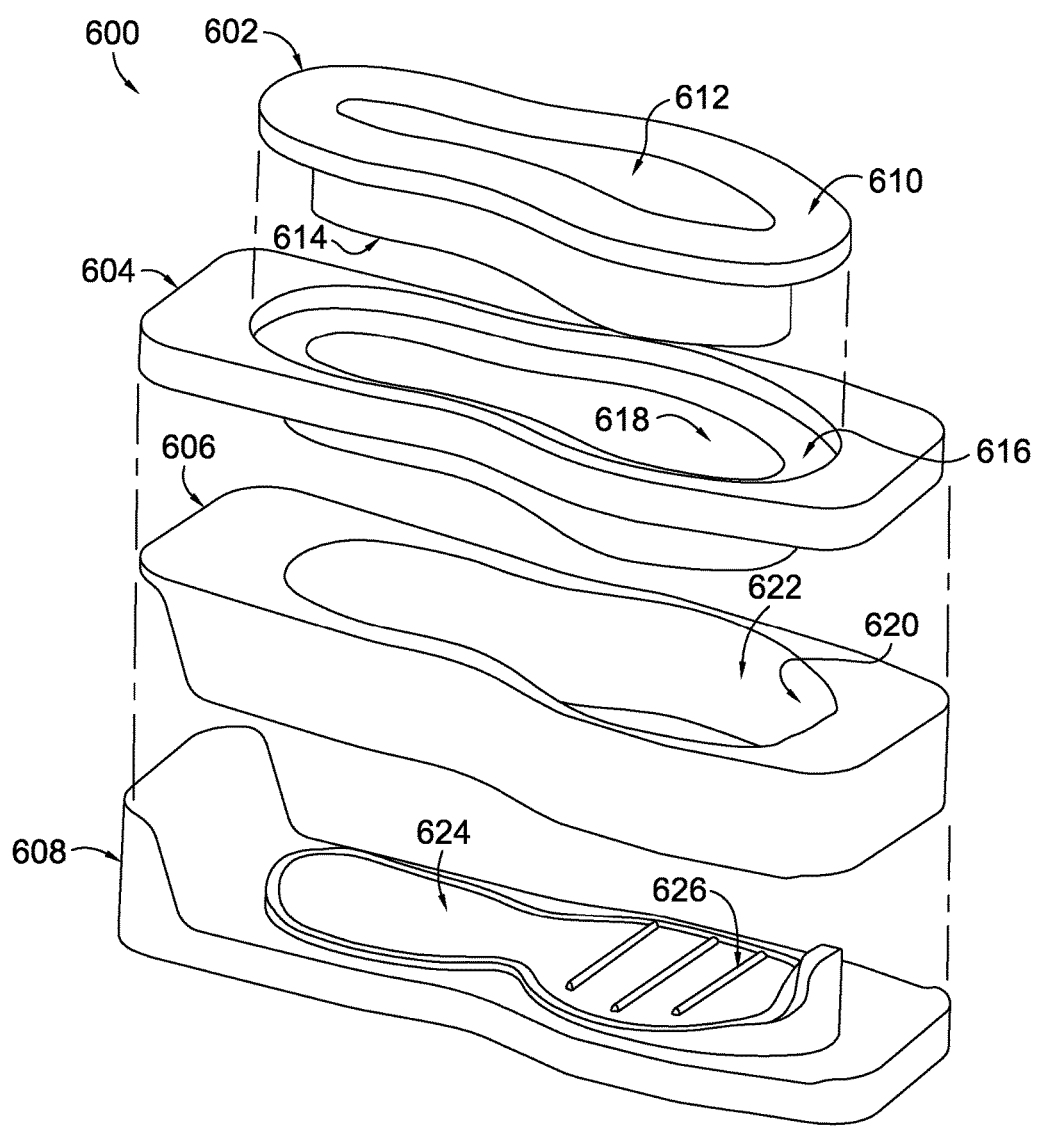
FIG. 6 depicts an exemplary exploded view of a footwear manufacturing tool for use with microwave energy, in accordance with aspects hereof.

Turning to FIG. 6, it depicts an exemplary exploded view of a footwear tool 600 for use with microwave energy, in accordance with aspects hereof. The tooling is comprised of a first tool portion 608 and a second tool portion. The second tool portion of FIG. 6 is comprised of a window component 602, a perimeter component 604, and a midplate 606. Unlike the tool 100 of FIGS. 1-3, the tool 600 has a multipart microwave reflective second tool portion.

The window component 602 is comprised of a recess 612, a flange 610, and a bottom surface 614. The recess 612 extends from the top surface toward the bottom surface 614 without extending through the bottom surface 614. As discussed previously, a recess may reduce material weight and/or microwave absorption, even by a microwave transparent material. The flange 610 provides an alignment and coupling feature to couple, either permanently or temporarily, the window component 602 to the perimeter component 604. The bottom surface 614 provides a part-contacting surface of the tool cavity formed in the tool 600, in an exemplary aspect.

The perimeter component 604 is comprised of a flange cavity 616 and a perimeter cavity 618. The flange cavity 616 is configured to receive the flange 610 of the window component 602. In an exemplary aspect, the flange 610 is recessed into the flange cavity 616 such that a flush top surface of the tool 600 is formed by the flange 610 and the perimeter component 604 top surface. The perimeter component 604, in an exemplary aspect, provides structural support and resilience to the window component 602. It is contemplated that the perimeter component 604 is formed from milled and/or machined aluminum, in an exemplary aspect. The structure forming the flange cavity 616, in an exemplary aspect, serves as a seal with another portion of the tool 600, such as the first tool portion 608. For example, the structure of the flange cavity 616 may extend through the midplate 606 to a location suitable for forming a mold seam with another portion, which may be the midplate 606 and/or the first tool portion 608.

The midplate 606 is comprised of a midplate cavity 622 and a sidewall 620, in an exemplary aspect. The sidewall 620 provides a part-contacting surface of the tool cavity formed by the midplate cavity 622 and the first tool portion 608. For example, the sidewall 620 may define a portion of the tool cavity in connection with the window bottom surface 614 and a bottom surface 624 of the first tool portion 608. The midplate 606 is formed from a metallic material, such as aluminum, that is reflective to microwave energy, in an exemplary aspect.

It is contemplated that the perimeter component 604 and the midplate 606 may be separate parts in an alternative aspect. However, in the example provided in FIG. 6, the perimeter component 604 and the midplate 606 are distinctly different parts. Separating the portions in the tool 600 may allow for easier machining/manufacturing of the complex curves in a more economical and/or efficient manner than forming the complex curves from a single component serving as both the perimeter component and the midplate, in an exemplary aspect.

The first tool portion 608 is comprised of the bottom surface 624. The bottom surface 624 forms a surface of the tool cavity of the tool 600. The bottom surface 624 is a part-contacting surface of the tool cavity. In an exemplary aspect, the first tool portion 608 is formed from a microwave reflective material, such as a metallic material. It is further contemplated that the first tool portion 608 is formed from cast aluminum and/or machined aluminum.

In an exemplary aspect, the first tool portion 608 is further comprised of a dimensional element. For example, the first tool portion 608 may form one or more features in the footwear component that is subjected to microwave energy within the tool cavity. Building on this example, it is contemplated that an EVA sole portion is place in the tool 600 such that the dielectric heat generated from the application of microwave energy causes one or more dimensional features (e.g., traction elements, hinge elements, recesses, protrusions) to be formed in the EVA sole portion by the dimensional element 626, in this exemplary aspect.

While a particular configuration, shape, and size of tool cavity is formed in the tool 600, it is contemplated that any structure may be utilized in aspects contemplated herein. Further, it is contemplated that any number of discrete components may form the tooling. Two or more window portions may be implemented in aspects hereof. Two or more components formed from a microwave energy reflective material may form the second tool portion. Two or more components may form the first tool portion 608. The tool may be formed from a window component and a first tool portion exclusively, in an exemplary aspect. Therefore, it is contemplated that any combination of components may be utilized to achieve a tooling for exposing microwave energy to a component of footwear.

Figure 7:
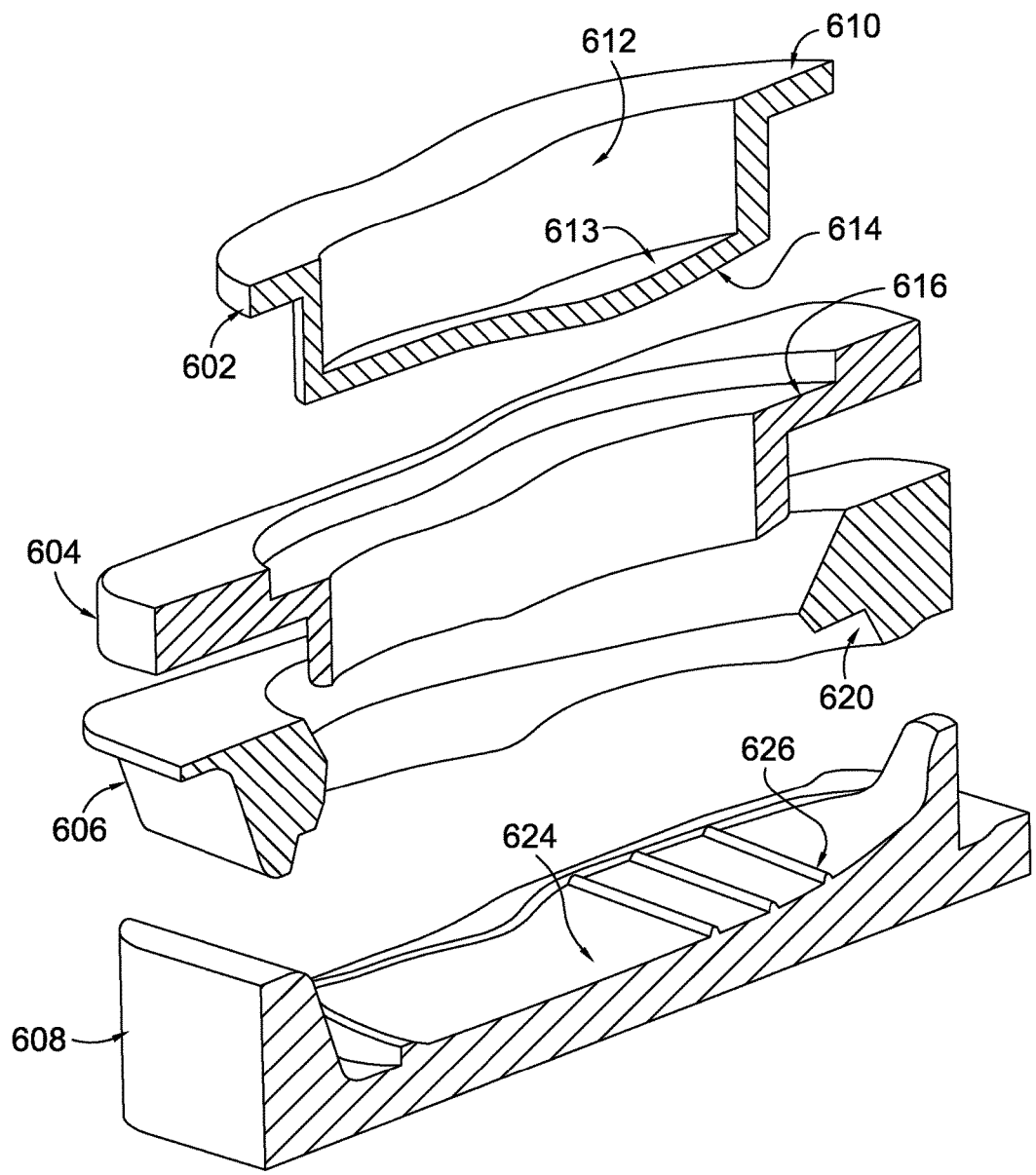
FIG. 7 depicts an exploded cross-sectional view of the tool from FIG. 6, in accordance with aspects hereof.

Turning to FIG. 7, it depicts an exploded cross-sectional view of the tool 600 of FIG. 6, in accordance with aspects hereof. As depicted, the window component 602 nests within the perimeter component 604. The window component 602 has a reduced material volume such that a top surface 613 extends below the flange 610 forming the recess 612. Further, as can be seen in FIG. 7, the sidewall 620 of the midplate 606 forms a part-contacting surface for the tool cavity. Therefore, the tool cavity of the tool 600 is defined, substantially, by the bottom surface 614 of the window component 602, the sidewall 620 of the midplate 606, and the bottom surface 624 of the first tool portion 608.

Figure 8:
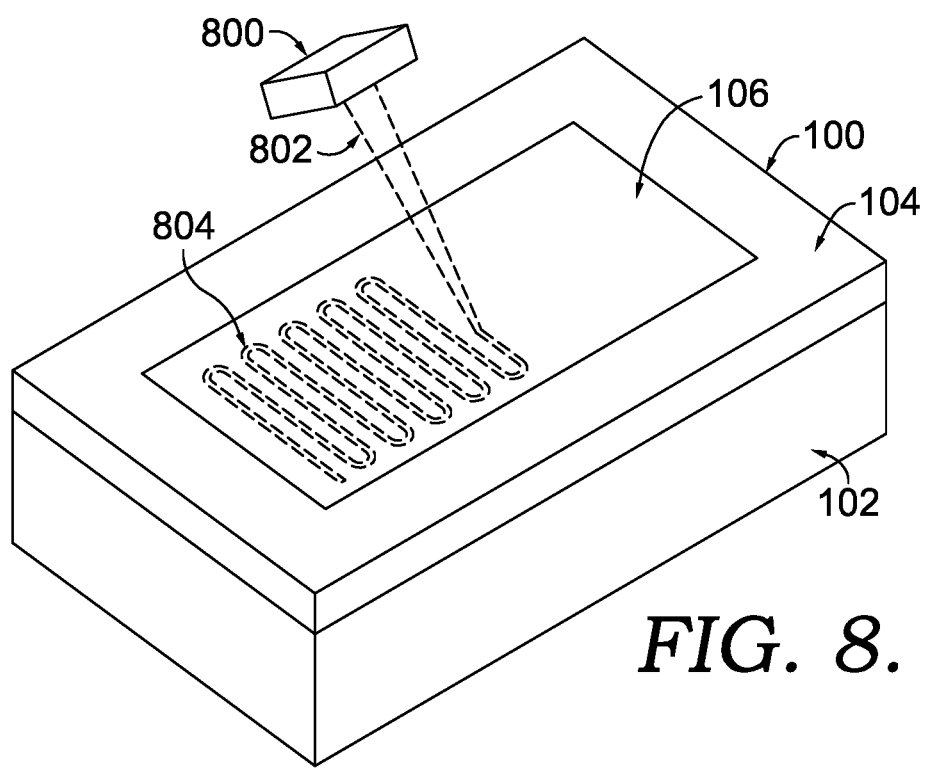
FIG. 8 depicts the tool of FIG. 1 with a microwave source providing a directed microwave beam thereon, in accordance with aspects hereof.

Turning to FIG. 8, it depicts the tool 100 of FIG. 1 with a microwave source 800 providing a directed microwave beam, in accordance with aspects hereof. As previously provided, the microwave source 800 may be a gyrotron, a klystron, and/or a traveling wave tube. The microwave energy beam is depicted a beam 802 emanating from the microwave source 800 to the window component 106. In an exemplary aspect, the microwave source 800 is a free space microwave energy source that communicates microwave energy to the tool 100 through open air and not confined, at least for a distance, by a guide or other physical containment structure. Stated differently, it is contemplated that the microwave source 800 is not physically coupled with the tool 100 along the path of beam 802. A free space arrangement may allow for the repositioning of the beam 802 without interference by a containment structure, such as a wave guide. While a direct path is depicted for the beam 802, it is contemplated that one or more reflective components, such as microwave mirrors, are positioned between the microwave source 800 and the tool 100. The intervening reflective components may be effective to direct microwave energy at a first location and then a second location to achieve an application pattern, such as an exemplary depicted pattern 804. It is contemplated that any pattern may be implemented to achieve a desired coverage of microwave energy on the tool 100 and the footwear component provided therein, in an exemplary aspect. The pattern 804 is illustrative in nature and is not limiting.

Figure 9:
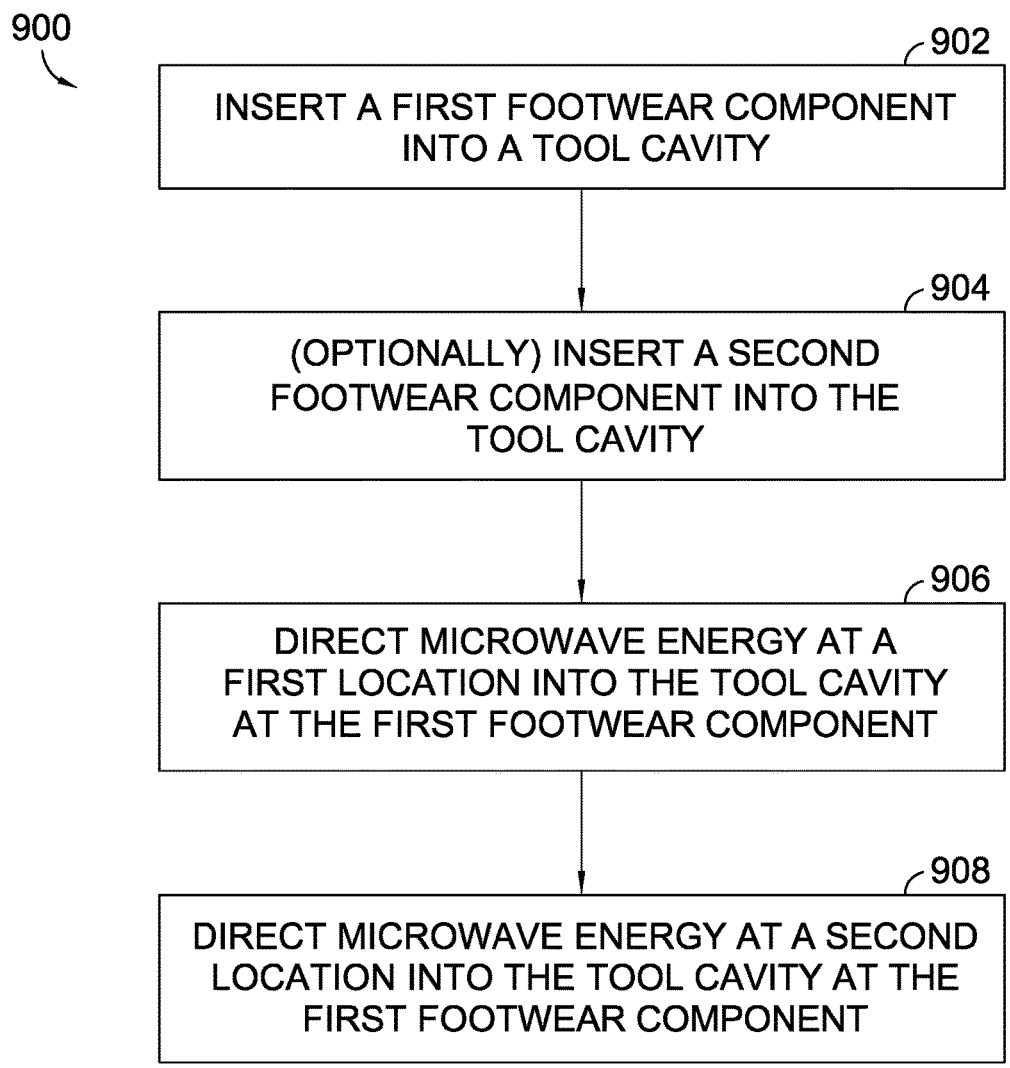
FIG. 9 depicts a flow chart representing a method of manufacturing a component of an article of footwear with directed beam microwave energy, in accordance with aspects hereof.

FIG. 9 depicts a flow chart 900 representing a method of manufacturing a component of an article of footwear with directed beam microwave energy, in accordance with aspects hereof. At a block 902, a first footwear component is inserted into a tool cavity of a tool, such as the tool 100 or 600 provided herein for illustration purposes. The first footwear component may be any component, such as a midsole, an outsole, an insole, and/or an upper.

At a block 904, which is optional, a second footwear component is inserted into the tool cavity. For example, it is contemplated that the first and second footwear components form at least a portion of a sole, such as a midsole and an outsole, respectively. It is further contemplated with the optional block 904 that an adhesive material (e.g., heat-activated adhesive) may also be included within the tool cavity, such as between the first and second footwear components. In an exemplary aspect, the adhesive material may have a dielectric heating response that is greater than the first (and optional second) footwear component. This greater dielectric heating response allows the adhesive to heat without causing potential deformation of the footwear components, in an exemplary aspect.

At a block 906, microwave energy is directed at a first location into the tool cavity at the first footwear component. As previously provided, the direction of the microwave energy may be accomplished through a reflective system that is effective to guide the microwave energy at determined locations, in an exemplary aspect.

At a block 908, microwave energy is directed to a second location that is different from the first location into the tool cavity at the first footwear component. By changing the location of microwave energy application, a determined amount of microwave energy may be applied to the footwear component(s) at known locations of the footwear component(s).

From the foregoing, it will be seen that this invention is one well adapted to attain all the ends and objects hereinabove set forth together with other advantages which are obvious and which are inherent to the structure. While aspects herein are specifically directed to the manufacturing of an article of footwear, it is contemplated that the concepts provided herein are relevant to other products and industries. For example, the aviation, automobile, medical equipment, and other fields may apply the concepts provided herein. In an exemplary aspect, it is contemplated that a manufacturing tool for use with microwave energy as contemplated herein and associated methods may be implemented to form a component for use in an automobile, airplane, boat, sporting equipment, protective equipment, medical device/equipment, furniture, building materials, communications equipment, electronics, and the like.

Exemplary multiple dependent claim language is provided hereinafter. The exemplary claims may include the terminology "any of." It is intended that "any of" includes any combination of the claims, including two or more. Further, "any of" also can be interpreted as "any one of" as well.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A footwear manufacturing tool for use with microwave energy, the footwear tool comprising:
a first tool portion formed from a first material, the first tool portion forming at least a part-contacting surface of a portion of a tool cavity; and
a second tool portion, the second tool portion comprising:
a window component, the window component formed from a second material, the second material is more transparent to the microwave energy than the first material, the window component forming a part-contacting surface of the tool cavity; and
a perimeter component having a top surface and an opposite bottom surface and a window opening extending through the top surface and the bottom surface, wherein the window opening is configured to maintain the window component.

2. The footwear tool of claim 1, wherein the first material is a metallic-based material.

3. The footwear tool of claim 2, wherein the first material is comprised of aluminum.

4. The footwear tool of claim 3, wherein the first tool portion forms a surface of the tool cavity.

5. The footwear tool of claim 1, wherein the second material is a substantially transparent material to microwave energy in a range from 10 GHz to 90 GHz.

6. The footwear tool of claim 5, wherein the second material is comprised of at least one material selected from polytetrafluoroethylene, silicone, quartz, and glass epoxy laminate.

7. The footwear tool of claim 1, wherein the perimeter component is formed from the first material.

8. The footwear tool of claim 7, wherein the perimeter component is formed, at least in part, from machined aluminum.

9. The footwear tool of claim 1, wherein the second tool portion is further comprised of a midplate, the midplate forms a portion of the tool cavity between the first portion and the window component.

10. The footwear tool of claim 9, wherein the midplate forms a surface of the tool cavity.

11. The footwear tool of claim 1 further comprising a microwave source, the microwave source selected from a klystron, a gyrotron, and a traveling wave tube.

12. The footwear tool of claim 1, wherein part-contacting surfaces of the tool cavity are formed from the first material except at the surface formed by the window component.

13. The footwear tool of claim 1, wherein the first material forms a part-contacting surface of the tool cavity at the first tool portion and the perimeter component.

14. The footwear tool of claim 1, wherein the window component extends across the tool cavity between perimeter surfaces of the tool cavity, such that the window component covers 90% or more of an area extending between the perimeter surfaces.

15. The footwear tool of claim 1, wherein the window component extends across the tool cavity between perimeter surfaces of the tool cavity, such that the window component extends to within 10 centimeters or less from the perimeter surfaces.

* * * * *